United States Patent [19]

Bricot et al.

[11] 4,387,452
[45] Jun. 7, 1983

[54] OPTICAL DEVICE FOR THE RECORDING AND READING OF DATA MEDIA AND OPTICAL MEMORY SYSTEM INCORPORATING SUCH A DEVICE

[75] Inventors: Claude Bricot; François Le Carvennec; Pierre Lepetit, all of Paris, France

[73] Assignee: Thomson-CSF, Paris, France

[21] Appl. No.: 226,805

[22] Filed: Jan. 21, 1981

[30] Foreign Application Priority Data

Jan. 23, 1980 [FR] France .................. 80 01424

[51] Int. Cl.³ .............................. G11B 7/08
[52] U.S. Cl. ........................... 369/32; 369/45; 369/112; 369/199
[58] Field of Search ............ 369/14, 30, 34, 35, 369/36, 37, 38, 39, 199, 32, 44, 45, 46, 100, 112; 358/128.5, 128.6, 342; 365/215, 234; 350/173, 255

[56] References Cited

U.S. PATENT DOCUMENTS

| | | | |
|---|---|---|---|
| 3,314,074 | 4/1967 | Becker | 346/108 |
| 3,381,085 | 4/1968 | Johnson et al. | 358/8 |
| 3,774,172 | 11/1973 | Silverman | 369/32 X |
| 3,848,095 | 11/1974 | Wohlmut et al. | 369/45 |
| 4,003,059 | 1/1977 | Sugiura et al. | 369/45 X |
| 4,015,289 | 3/1977 | Kinjo et al. | 358/128.6 |
| 4,094,010 | 6/1978 | Pepperl et al. | 369/44 X |
| 4,125,860 | 11/1978 | Ishii et al. | 369/45 X |
| 4,138,741 | 2/1979 | Hedlund et al. | 369/44 X |
| 4,322,838 | 3/1982 | Neumann | 369/45 |

FOREIGN PATENT DOCUMENTS

| | | |
|---|---|---|
| 2609980 | 9/1976 | Fed. Rep. of Germany . |
| 1466633 | 1/1967 | France . |
| 2312087 | 12/1976 | France . |
| 1042318 | 9/1966 | United Kingdom . |

OTHER PUBLICATIONS

IEEE Spectrum, vol. 16, No. 2, Feb. 1979, G. C. Kenney et al., "An Optical Disk Replaces 25 mag tapes", pp. 33-38.
Patents Abstracts of Japan, vol. 1, No. 37, Apr. 18, 1977, p. 2100 E76 & JP-A-51 134,514 (Tsukada)(Nov. 22, 1976).
IBM Tech. Disc. Bulletin, vol. 15, No. 2, Jul. 1972, Armonk, N.Y., R. L. Garwin: "Optics for Beam Addressable Files", pp. 494-495.

Primary Examiner—Stuart N. Hecker
Assistant Examiner—Donald McElheny, Jr.
Attorney, Agent, or Firm—Cushman, Darby & Cushman

[57] ABSTRACT

The device makes it possible to optically inscribe and/or read at least two facing sides of disks in an optical memory system, whose disks are stacked. A linear motor displaces a mobile means incorporating recording-reading heads. These heads receive via a bidirectional optical connection data to be inscribed and coming from fixed light emitters-receivers. Each of the recording heads comprises two focusing lenses associated with one of the two facing sides of the disk. According to a first variant, the two sides can be read simultaneously, each of the lenses being associated with its own control device. In a second variant, a single control device is provided and the two focusing lenses are integral with one another, each side being read or inscribed in succession.

18 Claims, 12 Drawing Figures

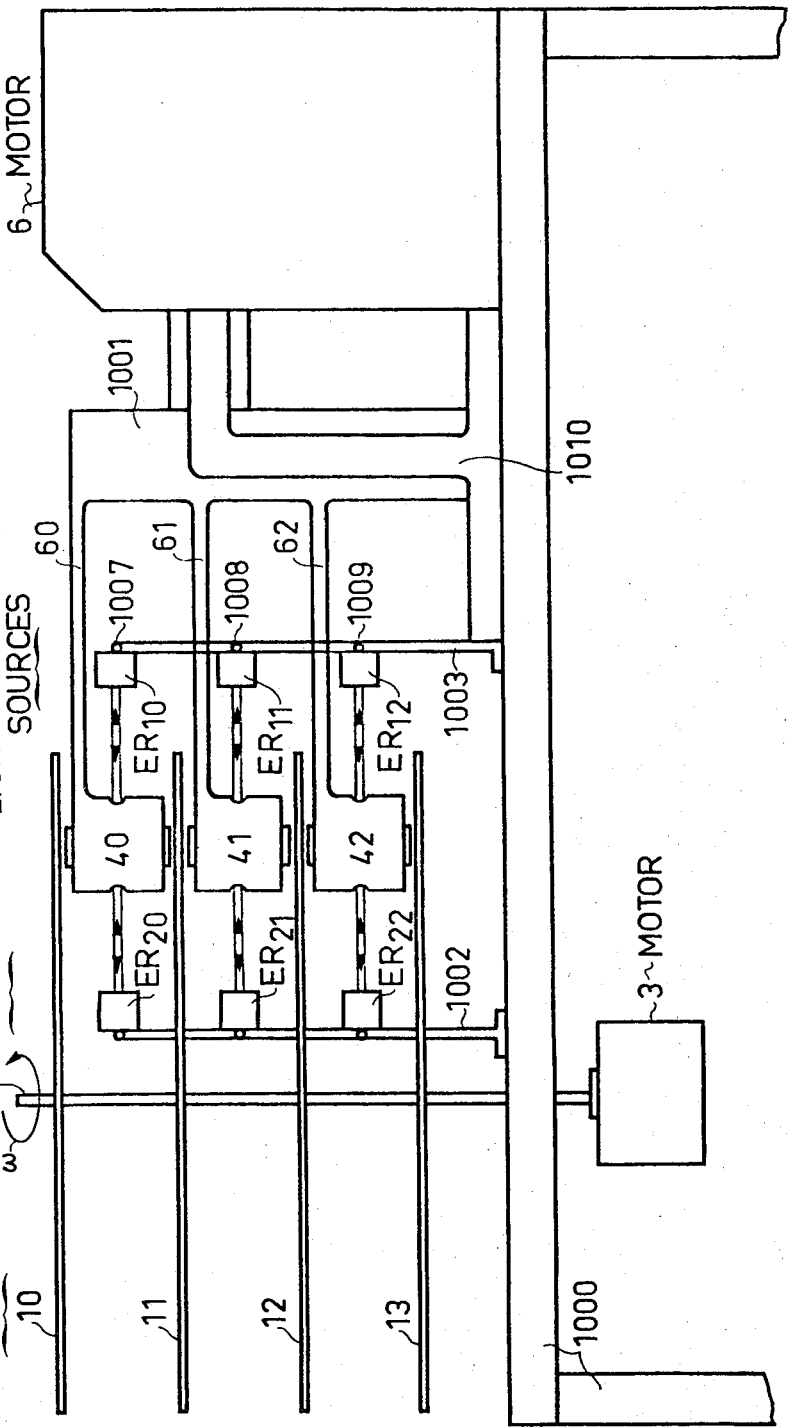

OPTICAL DEVICE FOR THE RECORDING AND READING OF DATA MEDIA AND OPTICAL MEMORY SYSTEM INCORPORATING SUCH A DEVICE

BACKGROUND OF THE INVENTION

The present invention relates to an optical device for the recording or inscribing and reading of data media and to an optical memory system incorporating such a device.

The known recorded and optically readable data media in the form of disks or tapes are such that the recorded or stored data are translated by local changes of one parameter of the recording layer, e.g. its height, optical refractive index, absorption, reflection or transmission coefficient, said changes being optically detectable by means of electro-optical sensors.

Generally, the data are recorded along a track which, as a function of the configuration of the medium, is either linear (tape) or in the form of a spiral or concentric ring (disk). The invention more particularly relates to digital data storage systems incorporating disks, because only they give rapid access to a particular region where data which it is wished to find are recorded.

A well known process for recording data consists of forming very small depressions on the disk surface, which are of variable length in the direction of the tracks. This variable length representing a time modulation of the data to be recorded.

As is known, reading can take place in accordance with two basic approaches, i.e. by reflection of light rays focused on a reflecting surface (e.g. a metal deposit made on the side of the disk carrying the minute depressions) or by transmission. In both cases, the focused rays are spatially modulated by the minute depressions representing the data recorded on the red side of the disk. Photoelectric cells detect the reflected or transmitted signals. The electrical signals detected by the photoelectric cells are then processed by suitable electrical circuits and are shaped so as to restore the recorded or stored data.

The reading and also writing light rays are produced, e.g. by a laser source. The rays are focused by means of a recording-reading head incorporating focusing optics and kept at a suitable distance from the surface of the disk to be read by means of control members.

The known optically readable disks make it possible to record approximately $10^{10}$ data bits in the case of a disk with a diameter of approximately 30 cm. Such disks can be used in digital data processing means in mass memory systems. It is obvious that the aforementioned capacity is completely inadequate for this. The same difficulties are encountered when using other types of disks, particularly magnetic disks. In addition, numerous processes have been proposed for increasing the individual capacity of a disk.

Firstly, it is known to record the data on the two sides of a disk, whilst maintaining constant all the other parameters (recording density, etc).

It is also possible to act on the geometrical parameters of the disk and in particular increase its diameter. However, this diameter increase leads to disadvantages such as an increase in the system inertia, risks of offcentring causing vibrations, increase in the sag of the disk and in the dimensions of the reader-inscriber in which the disk is placed. In addition, the actual disk is more difficult to manufacture.

The increase in the disk diameter, although permitting a correlative increase in the disk capacity, is an important reason for the increase in the average access time to an area of the disk in which data are or should be stored. Complementary processes permitting a greater storage capacity have been proposed, non-limitative examples of these being recording at a constant linear speed (asynchronous disks) and at constant angular speed (synchronous disks) or prior electronic compression of the data to be recorded. However, there is a recording density limit linked with the technology used and in particular the materials, the quality of the controls for the reading means and the appearance of parasitic phenomena. The upper recording density limit can be gathered from diffraction laws in the case of optical recording. Moreover, the data compression methods can only be used at the periphery of data processing systems, e.g. for the acquisition of digitized analog data, such as data acquisition in connection with seismic prospecting.

Another known method for magnetically recording digital data is to use a plurality of disks, arranged in stacks and read simultaneously or sequentially by a plurality of magnetic heads.

This method is advantageous in connection with magnetic recording and reading because the magnetic heads have limited dimensions and weight. However, this is not the case with optical recording and reading heads which, besides the actual optical elements incorporate a position control device, at least in a direction orthogonal to the plane of the disk. This device incorporates metal pole pieces having a by no means negligible weight and size. Thus, serious difficulties are encountered when using this method in connection with optical recording so that the resulting recording apparatus is heavy and cumbersome as a result of the increase in the number of heads. The apparatus is also complex due to the present electrical connections carrying the control signals of the position control device.

BRIEF SUMMARY OF THE INVENTION

To obviate the disadvantages of the prior art the present invention aims at proposing an optical recording and reading device of a simplified nature, which is able to record (or read) on or from at least two disks, this being carried out sequentially or completely simultaneously.

The present invention therefore relates to an optical device for the recording and reading of data media incorporating at least two stacked disks rotated about a common axis, wherein it comprises a mobile means incorporating at least one recording-reading head provided with two lenses arranged head to tail and whose optical axes are orthogonal to the main faces of the disks, each recording-reading head being introduced between two consecutive disks and being associated with one of the facing sides of the two consecutive disks and a system of fixed light emitters and light receivers, the emitters producing a beam of light rays which are parallel to one another and parallel to the main faces of the disks, each of the two focusing lenses of one recording-reading head being associated with a particular light emitter and a particular light receiver by means of a mirror reflecting back to said two lenses.

The invention also relates to an optical memory system incorporating such a device.

BRIEF DESCRIPTION OF THE DRAWINGS

The invention is described in greater detail hereinafter relative to non-limitative embodiments and the attached drawings, wherein show:

FIG. 10 an embodiment of an optical memory system using the device according to the invention.

DETAILED DESCRIPTION OF THE PREFERRED EMBODIMENTS

Figure 1:
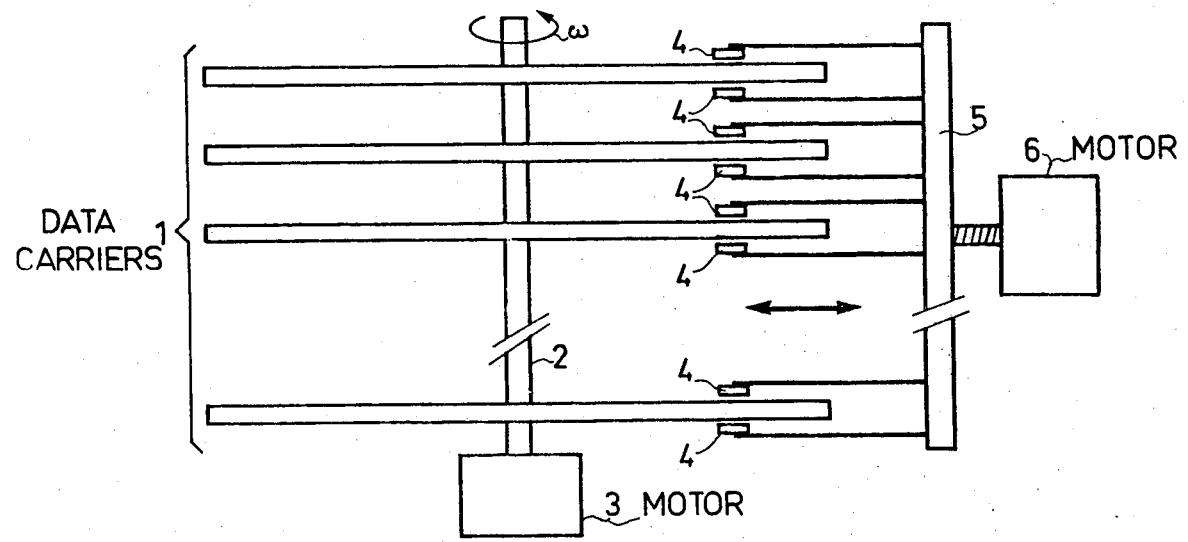
FIG. 1 a magnetic memory system incorporating a stack of disks.

FIG. 1 illustrates a magnetic memory system incorporating a plurality of disks 1 arranged in the form of a stack on a shaft 2 and rotated $\omega$ by means of a driving motor 3. The disks 1 of FIG. 1 have two sides. A recording-reading head 4 is associated with each side. The heads 4 are integral with a support 5 displaced by an e.g. linear motor 6 in such a way that the heads 4 can move parallel to the surface of the disks and preferably in a radial direction.

The data in the form of binary words is arranged in per se known manner along concentric circular tracks. The architecture of the recording-reading system must be carefully chosen so as to permit a minimum access time to the desired area, but this falls outside the scope of the invention. A known process consists of recording the data in parallel, i.e. simultaneously on the different sides of the disks. Thus, during reading, each of the bits forming a binary word is read by one of the heads 4 and the complete word is transmitted to not shown electronic circuits. In operation, the heads "float" very close to the surface of the disk as a result of the "air cushion" effect. Only a radial control is necessary.

Consideration could be given to the use of this process for optical recording-reading. However, the constraints referred to hereinbefore more particularly in connection with the fact that the recording-reading head must have a control device prevent a simple transfer of the aforementioned process to the optical recording-reading process.

The invention proposes measures making it possible to utilize the aforementioned process which do not lead to a undesirable increase in the complexity of the optical disk memory system incorporating the recording-reading device.

Figure 2:
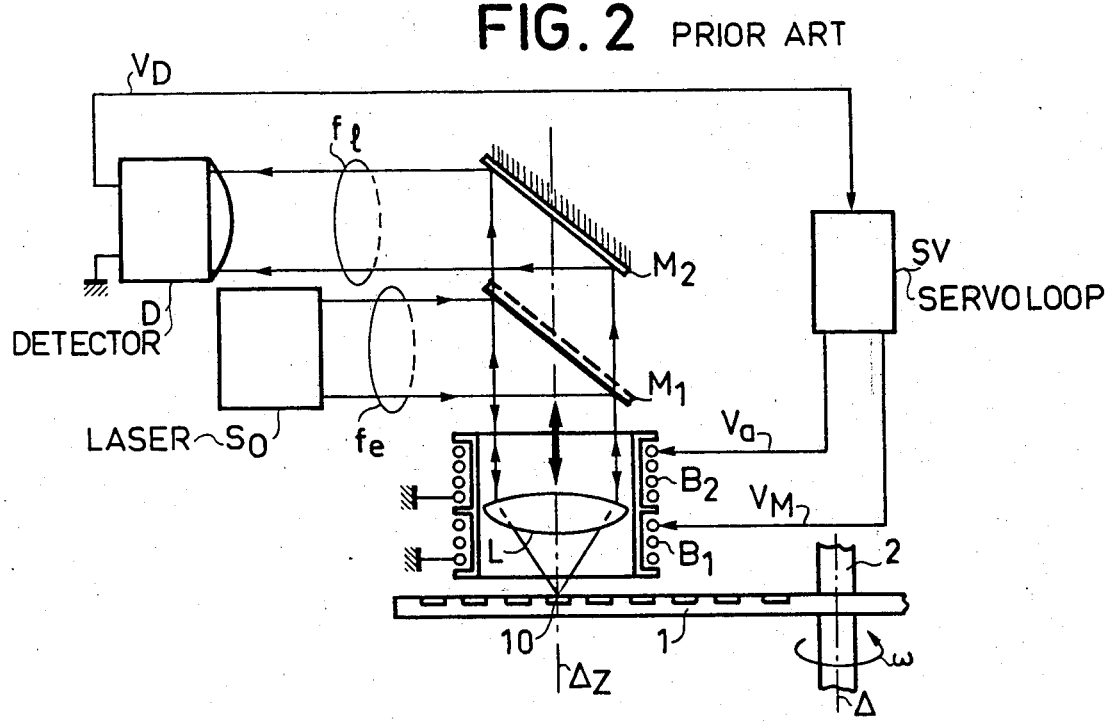
FIG. 2 the operation of a prior art device for the optical recording-reading on a single disk.

Before describing the invention, it is useful to briefly refer to the operation of a device for recording-reading on a single optical disk. FIG. 2 illustrates such a device. In FIG. 2, a disk 1 is rotated by a shaft 2 and carries data elements 10 recorded in the form of minute depressions of concentric circles forming a track with a width less than 1 micrometer (typically 0.6 $\mu$m) and of very limited depth (0.15 $\mu$m), the spacing between the tracks being less than 2 $\mu$m (e.g. 1.6 $\mu$m). The data-carrying disk has a typical diameter of 30 cm and the data elements are recorded on an area with a radius of approximately 10 cm. The reading and recording of a track is performed by means of a beam $f_e$ from a laser source $S_0$ and focused onto the disk by means of a larger aperture lens, e.g. of the microscope lens type, symbolized by lens L after reflection onto a semi-transparent plate $M_1$. A small variation in the distance between the disk and the lens leads to defocusing which is prejudicial to the reading, because the latter is based on diffraction phenomena of the radiation concentrated on the disk by the relief inscribed on the track. Thus, in the case of reading devices for use with such disks, it is necessary to provide a vertical focusing control, the mechanical qualities of the disk being inadequate to ensure that the read-out signal is correct in the absence of such a control. The presently used reading devices satisfy this function by means of a mobile solenoid integral with the reading lens and sliding in a circular air gap. In actual fact, two separate solenoids $B_1$ and $B_2$ are used. The first solenoid $B_1$ is used for maintaining the lens in the inoperative position thereof when there is no medium to be read, for investigating the focusing area at the start of medium read-out and for the return to the engagement area of the control means during reading. The second solenoid $B_2$ is used in the engagement area.

In the absence of a medium to be read, the lens is maintained in an inoperative position by means of a continuous signal $V_M$, which energises the prepositioning winding $B_1$.

In normal operation with a medium to be read, the reading or recording spot being in an area adjacent to the focused position, a fraction of the instant radiation is reflected by the medium, traverses lens 4, is reflected by a partly reflecting plane $M_1$, reflected by a mirror $M_1$ into a beam $f_1$ and detected by a detection cell D. The electrical signal supplied by cell $V_D$, which characterizes the vertical focusing error, is applied to the input of a control chain SV.

At its output, the latter supplies control signals $V_a$ for solenoid $B_2$. This chain also supplies the aforementioned maintenance signals $V_M$.

In actual fact, cell D is a complex cell with a plurality of quadrants and is also used for detecting the actual read-out signals. Thus, the beam reflected by the surface is modulated by the minute depressions 10 at the frequency with which the latter pass in front of the lens. Not shown electronic circuits discriminate the signals representing the data carried by disk 1 and the high frequency signals used for control purposes.

It is also necessary to provide a device ensuring the radial following of the track. As a function of the radial direction, the precision in the positioning of the reading spot must be approximately 0.1 $\mu$m to ensure a good reading of the track. The radial following can be carried out by means of a galvanometer mirror which is able to rotate about an axis parallel to the plane of the disk and orthogonal to the radius, placed above the optical head and receiving the laser beam. It can be constituted by mirror $M_1$. The radial following can also be provided by mechanical means, e.g. a motor driving a lead screw ensuring the displacement of the optical head in said radial direction.

A more detailed description of a recording-reading device appears, for example, in French Pat. No. 7,533,465, published as 2,330,062.

One of the most important aspects of the invention is to divide the recording-reading device into two distinct assemblies. A first fixed assembly comprises the members for the emission and reception of the light energy used for reading or recording purposes. The second assembly or mobile means comprise the recording-reading head, the vertical control motor and the radial control motor. The connections between these two assemblies are by means of a beam of parallel light rays.

Figure 3:
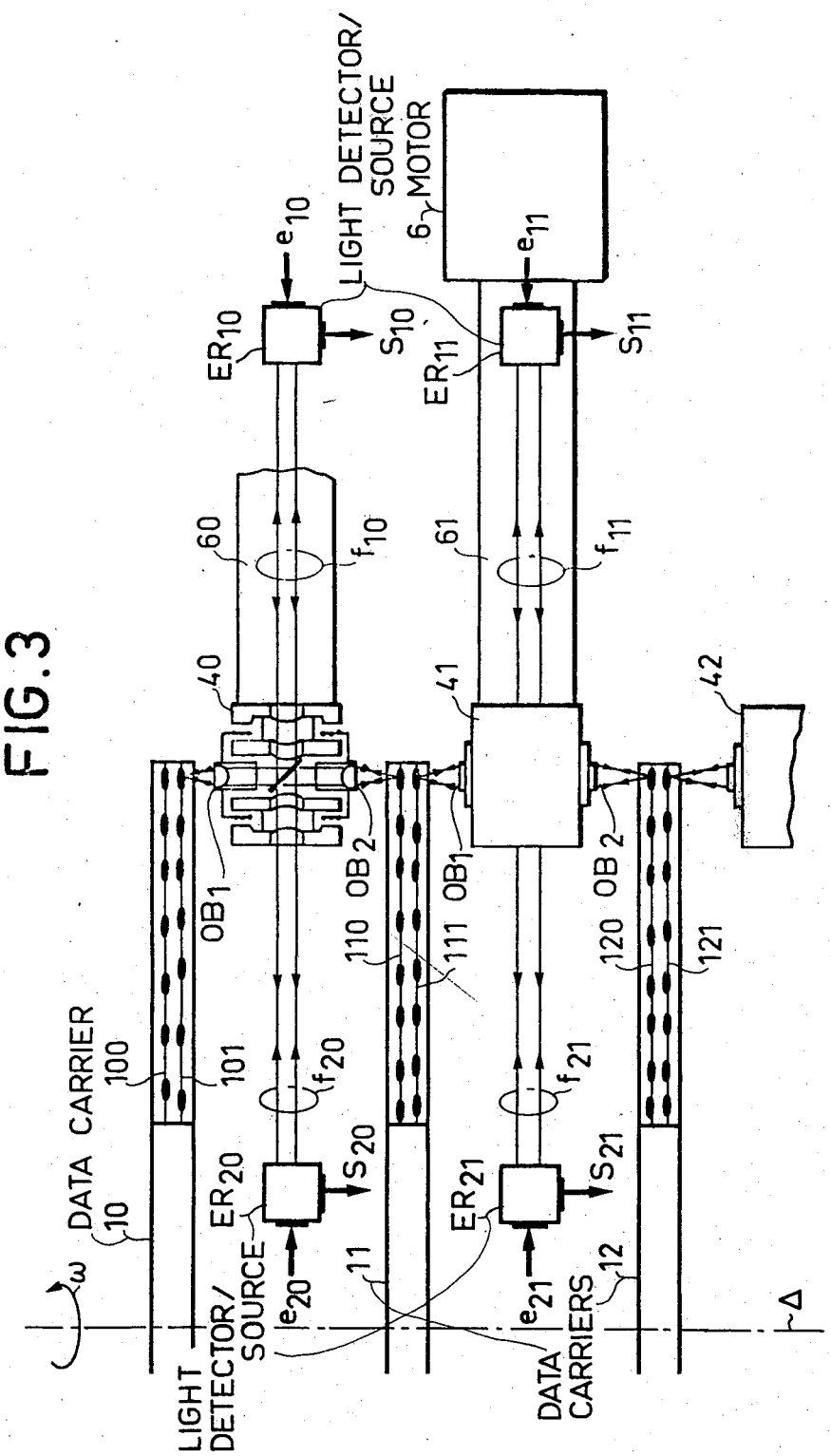
FIG. 3 a first constructional variant of the recording-reading device according to the invention.

This first arrangement is shown in FIG. 3, which illustrate an optical data recording-reading system according to a first constructional variant. This system comprises a stack of optical disks 10 to 12 comparable to disk 1 of FIG. 2. However, these are two-sided disks, each side 100, 101, 110, 111, 120, 121 having tracks on which are inscribed data, e.g. in the form of minute depressions. The disks are rotated $\omega$ about axis $\Delta$.

According to this first variant, two facing sides, e.g. lower side 1 of disk 10 and upper side 110 of disk 11 can be read completely simultaneously. To this end, each of the recording-reading heads 40 to 42 has, in the manner to be described in connection with FIG. 6, two microscope-type lenses able to move in a direction parallel to axis $\Delta$. The movements of these lenses are controlled by a system of control solenoids comparable to those described with reference to FIG. 2.

The recording—reading heads are moved in a direction parallel to the surface of the disks by a motor 6 mechanically coupled to the heads by transmission shafts, two of which 60 and 61 are shown in FIG. 3. According to a preferred variant, this motor is a linear stepping motor.

As stated hereinbefore, the recording-reading heads 40 to 42 are optically connected with a system of light emitters-receivers $ER_{10}$, $ER_{20}$, $ER_{11}$ and $ER_{21}$. Two light emitters-receivers are associated with each of the heads and more specifically one light emitter-receiver is associated with each of the two microscopes of a recording-reading head and consequently to one of the two read sides of the disks. FIG. 3 also shows the beam of parallel rays forming bidirectional optical connections $f_{10}$, $f_{20}$, $f_{11}$ and $f_{21}$.

According to a preferred embodiment, each of the light emitters comprises a stigmatic optical device for the emission and reception of coherent radiation forming a stigmatic image of a laser source positioned at a predetermined point in order to illuminate a reflecting surface. This device also ensures the separation between the beam from the source and the beam reflected by the surface.

Figure 9:
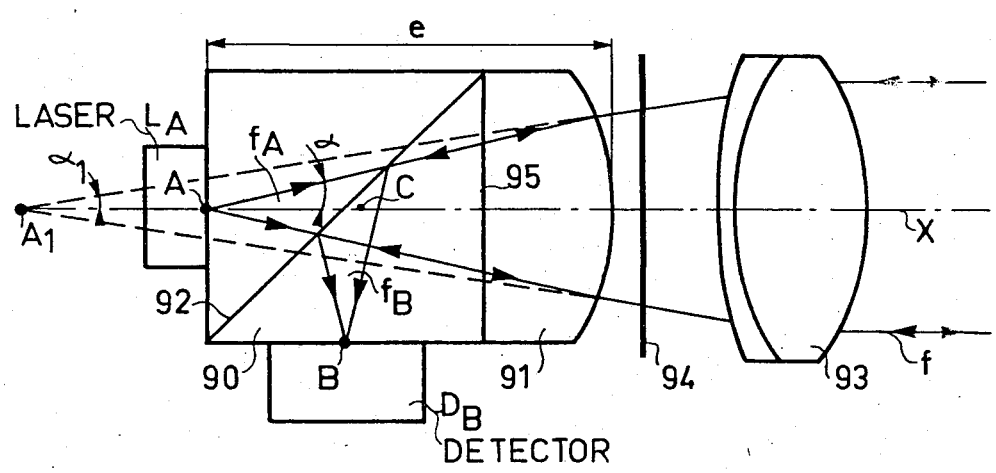
FIG. 9 a light emitter-receiver usable in the variants of FIGS. 3 to 5.

FIG. 9 illustrates a specific embodiment of such an optical device in the form of a parellelpiped 90, constituted by two adhered prisms. The separation surface 92 formed by the hypotenuse of the two prisms has a polarization separating function. If transmits all the radiation having a given polarization and reflects all the radiation having a polarization orthogonal to the first-mentioned polarization. Therefore, a plano-convex lens 91, formed from the same material as the cube, is adhered to one of the faces 95 of cube 90. The centre C of the sphere formed by the convex face of lens 2 is located on a median plane of the cube. Its radius of curvature R such that the point A located at the point where the optical axis X of lens 91 meets the face of the cube opposite to the face 95 is a Weierstrass point of the dioptre constituted by the spherical surface of lens 91. In other words, the optical block formed by the cube 90 and the lens 91 forms a stigmatic image of point A at point $A_1$ and it is known that the latter is virtual if A is real. The Wierstrass conditions are as follows. When the refractive index common to the cube and to the lens is n and when the external medium is air: $CA = R/n$, $CA_1 = nR$. The first condition gives the relationship between the thickness of the assembly and the radius $$R : R = e \frac{n}{n+1}.$$

When this relationship is proved, on positioning at A a radiation source polarized in the direction corresponding to a transmission by face 92, emitting a divergent beam of cone semi-angle $\alpha_0$ in air, said angle becomes $\alpha$ in the cube and the emergent beam from the lens issued at the virtual point $A_1$ has a cone semi-angle $\alpha_1$ with sin $$\alpha_1 = \frac{\sin \alpha}{n} \text{ and } \sin \alpha = \frac{\sin \alpha_0}{n}.$$

Moreover, as element 90 is cubic, point B linked with A with respect to face 92 is located on another face of the cube and is also a stigmatic point, so that a convergent beam at the virtual point $A_1$ reaching lens 91 and having a polarization orthogonal to the aforementioned polarization is reflected by face 92 and converges at point B. Conversely, a beam from B, polarized orthogonally to that of beam from A is reflected by face 92 and is superimposed on the beam from A. Although parallelepiped 9 and lens 91 are described as two separate components, this is not necessary. The optical block 90,91 can also be produced in such a way that face 95 is not materialized.

The device is intended to be used in association with a semiconductor laser $L_A$ having its phase centre at point A and an opto-electrical detection means centred on point B or in the vicinity thereof. The respective functions of A and B can be reversed, i.e. the detection means can be positioned at A, i.e. on axis X and the laser at the link point B. The device is completed by a lens 93, whose optical axis coincides with axis x and which is positioned behind lens 91 in such a way that its focus is at point $A_1$. The lens is designed in such a way as to have no spherical aberrations for the maximum beam aperture supplied by the laser positioned at A, as the complete optical system must remain stigmatic. For example, it can be a doublet and then a parallel beam f is obtained, which is transmitted to the recording-reading head associated with the device. If the beam back from the head coincides with the incident beam, to ensure that said beam is focused at B, its polarization must be orthogonal to the polarization of the beam from A. For this purpose, a quarter-wave plate 94 is positioned either between lens 91 and lens 93, or between lens 93 and the associated head on the path common to the incident and reflected beams. The optical axis of plate 94 forms an angle of $\pi/4$ with the polarization direction of the incident beam in such a way that after passing through the plate, a circular polarization is obtained and following an outward and return motion a linear polarization is obtained, but orthogonal to the initial polarization. This operation between the beam from laser $L_A$ and the reflected beam could optionally be obtained without a quarter-wave plate and with a separating surface 92, which does not separate polarization, but which is only semi-transparent. The detection means $D_B$ positioned at B or in the vicinity of the latter may comprise, in per se known manner, four photodiodes arranged in a plane parallel to the face of the cube having a point B and at a predetermined distance from said face. These diodes have a double function. The output signals are used for the actual reading and for creating signals necessary for the vertical and radial positioning controls of the lens associated with the emission-reception device.

The control signals of the lasers and their electrical supply are designated by references $e_{10}$, $e_{20}$, $e_{11}$ and $e_{21}$ in FIG. 3. They are conventional electrical connections. The same applies regarding the output signals of the photodiodes; $S_{10}$, $S_{20}$, $S_{11}$ and $S_{21}$. These signals are transmitted or come from electronic signal processing circuits associated with the optical memory system. These circuits do not fall within the scope of the invention and will not be described.

The recording—reading head of the variant of FIG. 3 will now be described relative to FIG. 7. The arrangements for realising this head constitute one of the most important aspects of the invention and, together with the division of the device according to the invention, into two separate assemblies, significantly contribute to the reduction of the weight and overall dimensions of the device and more particularly to the weight and overall dimensions of the mobile means, thereby reducing the inertia of the latter.

Each recording head comprises, in the manner indicated hereinafter, two focusing lenses $OB_1$ and $OB_2$ arranged head to tail. These lenses are of the microscope type. They are in the form of an elongated cylinder of approximate diameter 7 mm. The focal distance is approximately 5 mm. The lens weight is approximately 1 g.

Each of these lenses is integral with a control solenoid, respectively $B_{10}$ and $B_{20}$ which, as stated in connection with FIG. 2, are constituted by two coils. As illustrated by FIG. 7 providing partial sections revealing the hidden elements, these lens-solenoid assemblies slide in a shaft made in a soft metal pole piece, respectively 401 and 402. The inner walls are lined with a covering permitting friction-free sliding. The covering material can in particular be polytetrafluoroethylene.

The disks read by this head can have a film of approximately 1 mm. The amplitude of the movements of the lens associated with one side of the disks must therefore permit vertical positioning corrections of this order of magnitude. The distance between the end of the lens and the disk surface is typically approximately 0.5 to 1 mm.

The magnetic circuit is closed by a second pole piece and an annular ferrite member, respectively 409–411 and 410–412.

The assembly of these metal members is integral with a light material body 413, e.g. made from a plastics material. This body is itself perforated by a vertical shaft 415. The latter contains a mirror 416, which reflects on both its faces. It can be a polished metal mirror or preferably a glass mirror, whose surfaces are treated by a dielectric material deposit. This mirror is fixed with respect to the body 413 of the head. The two lenses $OB_1$ and $OB_2$ have the same optical axis, which is orthogonal to the surfaces of the read disks. Mirror 416 forms an angle of $\pi/4$ of this optical axis and is fixed by spindles 417 to the wall. The body of head 413 also has two openings, whereof one 418 can be seen in FIG. 7. These openings are arranged on either side of mirror 416. They serve to permit the penetration of parallel beams coming from the light emitters-receivers described hereinbefore.

Not shown output channels must also be provided for passing out electrical connecting wires carrying the solenoid control signals.

Figure 7:
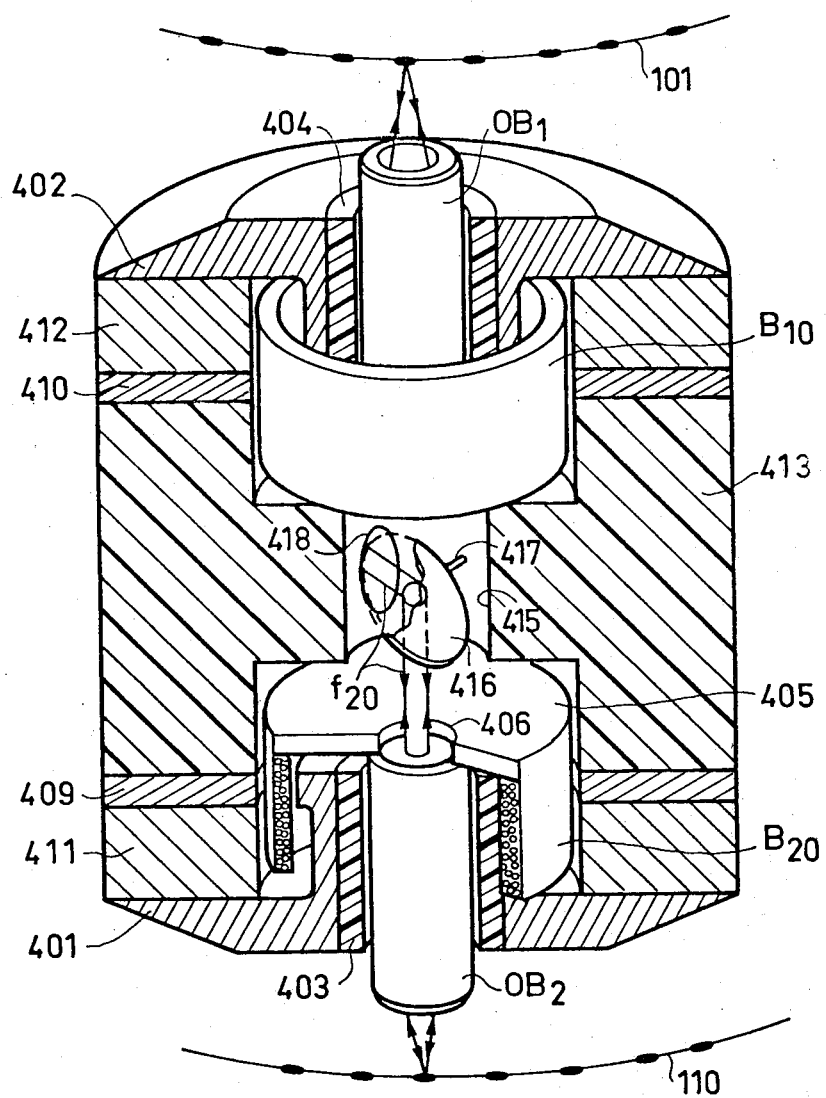
FIGS. 7 and 8 partial sections of recording-reading heads usable in the constructional variants of FIGS. 3 to 6.

FIG. 7 shows one of these beams, e.g. beam $f_{20}$ of FIG. 3. This beam is reflected towards lens $OB_2$ and is focused on the surface 110 of the read disks, whereof one track is symbolized by discontinuous lines. As each of the lenses is actuated by an independent vertical control solenoid the two facing sides 101, 110 can be read completely simultaneously.

Figure 4:
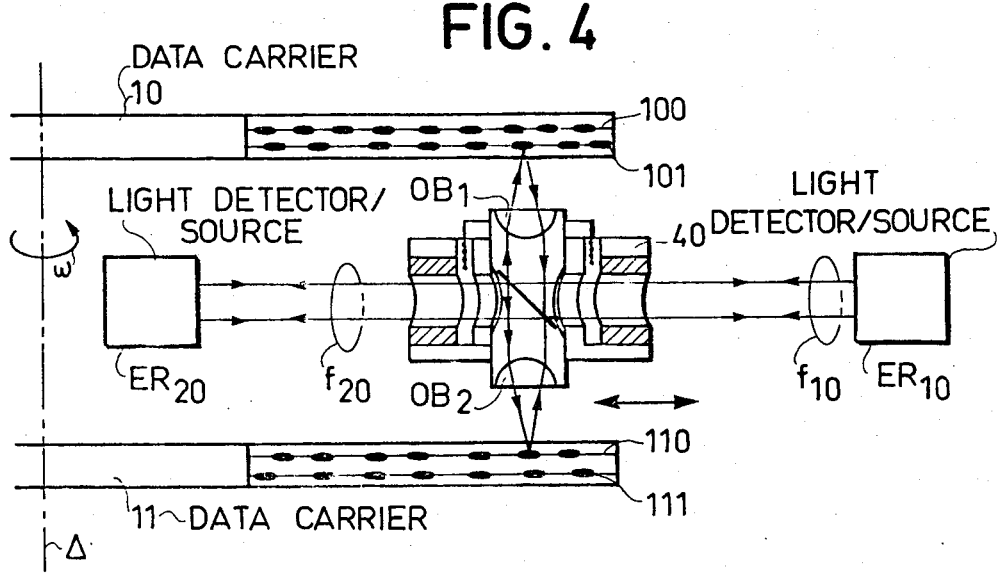
FIGS. 4 to 6 other constructional variants of recording-reading devices according to the invention.
Figure 8:
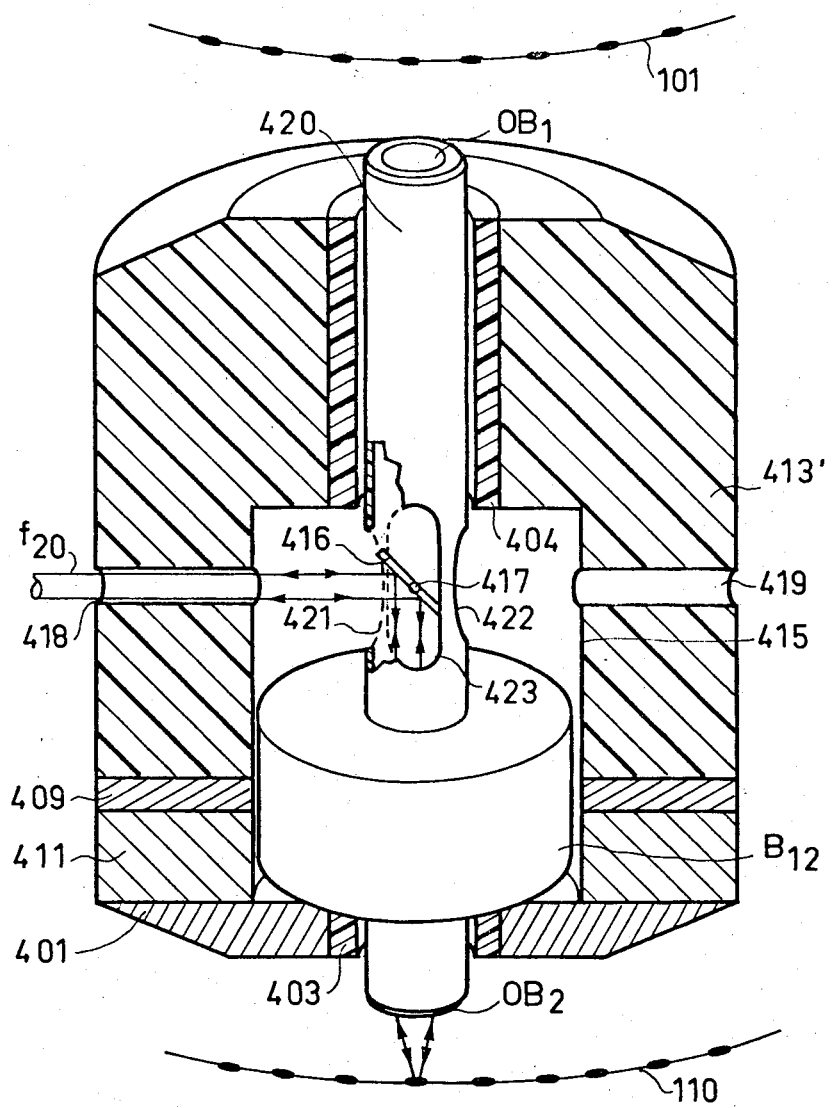

A second simplified constructional variant of the invention will now be described relative to FIGS. 4 and 8. The components of FIG. 3 occur once again and the essential difference relates to the recording-reading heads, whereof only one is shown.

According to this variant, the head has a single control solenoid 12 for the two lenses $OB_1$, $OB_2$, which are integral with one another. The components are the same as in FIG. 7 and need not be described again. The only differences are the body of head 413' which extends into the area previously occupied by the parts of the magnetic circuit 402, 410, 412 and the fact that the two lenses are mounted on a common cylindrical body 420. The latter has four openings, one pair 421, 422 facing the other pair 418, 419 respectively, allowing the light beams to enter the head, whilst two further supplementary openings, whereof only one 423 is visible in FIG. 8 are provided for the passage of the securing spindles for mirror 416, e.g. spindle 417. The radius of these openings must be sufficient to permit vertical movements of the cylinder permitting the control of one of the microscopes $OB_1$ or $OB_2$ on the face of the disk associated therewith, respectively 101 and 110. Thus, in this simplified version, it is only possible to read or inscribe one side at once. If the optical memory system has n disks, i.e. 2 n sides, simultaneous access is only possible to n information tracks.

Figure 5:
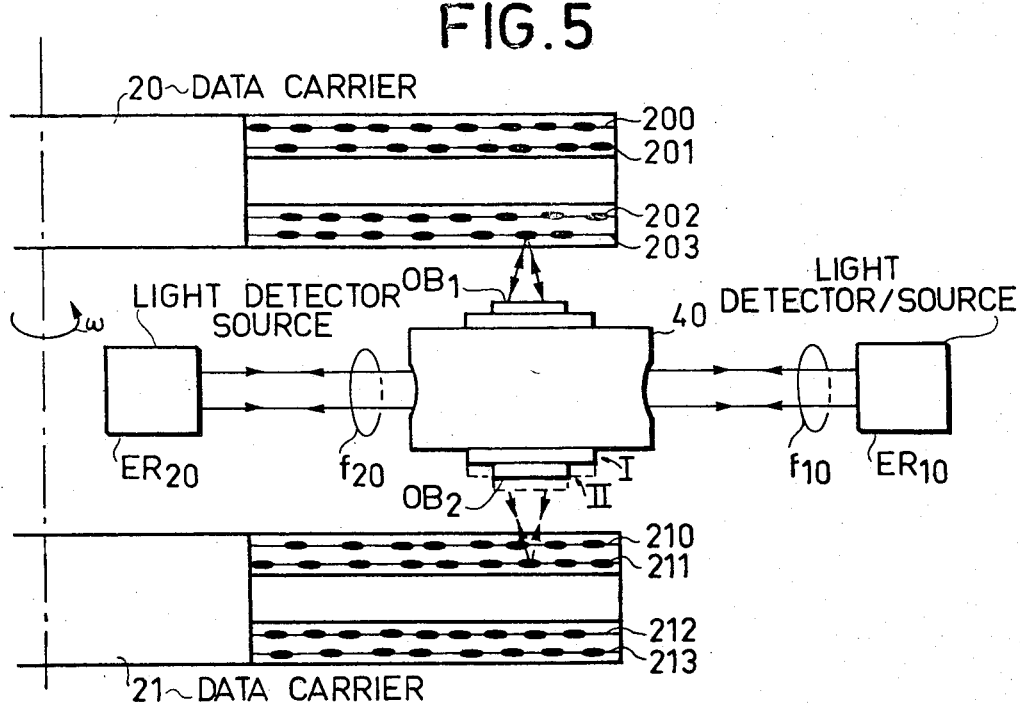

The invention also makes it possible to read data in multilayer disks. Such disks have recently been proposed and have a number of data levels for each of their two sides. These levels correspond to partial metallization layers deposited during a sequential production process on elementary disks, which are then assembled by processes which fall outside the scope of the invention. FIG. 5 diagrammatically illustrates such disks 20 and 21 and the successive layers carry recorded data: 200 to 203, 210 to 213. One of the recording-reading heads described hereinbefore can be used.

In order to read e.g. track 210, the beam from the light emitter-receiver $ER_{20}$ is focused onto said track by means of lens $OB_2$. This reading phase is represented by position I of lens $OB_2$. If it is desired to read track 211, the beam is focused onto said track: lens $OB_2$ shown in dotted line form in position II. During the passage of layer 210, part of the light intensity of the beam is reflected and part transmitted to layer 211, which is then reflected by this layer and again retransmitted in part during the passage of layer 210 towards lens $OB_2$. By adjusting the reflection coefficient of these various layers (of which there can be more than 2, e.g. 3) it is possible to ensure that the light quantity reflected towards the reading lens is comparable, no matter what the read layer. Within the scope of the invention, the only adaptation necessary is that the possible amplitude of the vertical movements of the reading lens is adequate so that on the one hand it is possible to carry out focusing changes to pass from the first to the last layer and on the other hand take account of the disk film, as stated hereinbefore.

Figure 6:
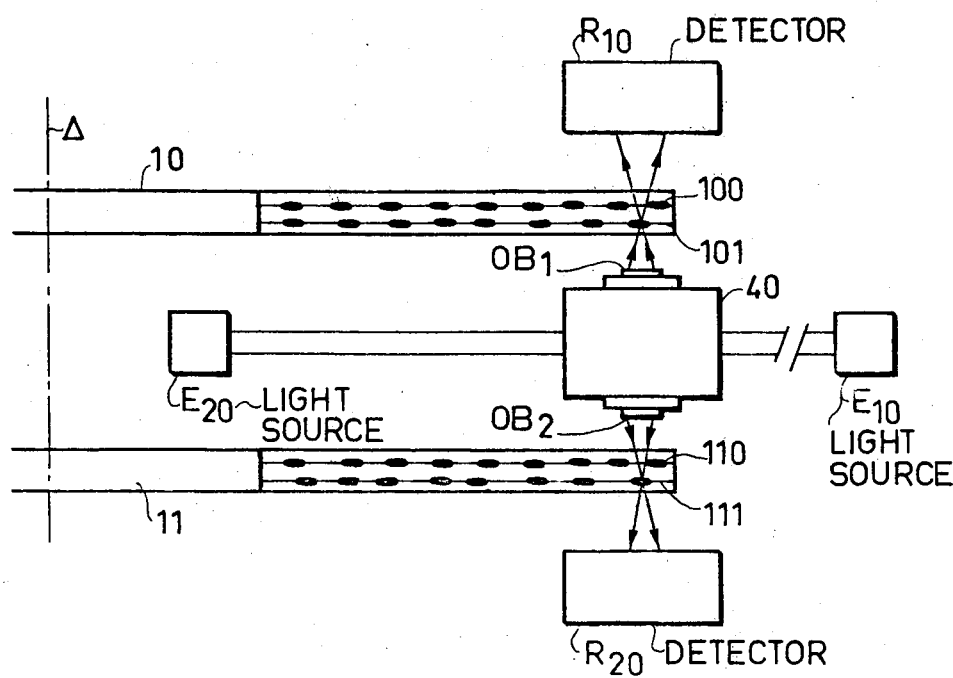

Finally, the invention also makes it possible to read and/or record the disks by transmission. Such an arrangement is illustrated in FIG. 6. It is then necessary to place detectors on the side of the disk opposite to the recording-reading head. The light emitters-receivers are replaced by light emitters $E_{10}$, $E_{20}$.

To this end, it is possible to use for example a device having a mobile means incorporating a galvanometer mirror and a focusing lens, able to move relative to the data medium and a fixed light energy source incorporating at least one laser emitter. Magnifier optical means of the afocal type are also incorporated into the mobile means and the light energy source. The magnification is adequate to ensure that the beam emerging from the optical means completely covers the entrance pupil of the lens. As a result, the light beam reaching the mobile means remains a beam of parallel rays, no matter how said means are positioned relative to the light energy source.

Within the scope of the invention, the focusing lens is one of the lenses $OB_1$ or $OB_2$. The light detectors or receivers are $R_{10}$ and $R_{20}$, as hereinbefore, and incorporate an assembly of photodetectors, but may be linked with the mobile means.

A particular track, e.g. 101 and 111 of this type illustrated in FIG. 6, is read by focusing by means of the lens associated with the reading beam on said track. In FIG. 6, it is assumed that the recording-reading head is of the type described relative to FIG. 6, i.e. a head permitting the simultaneous reading of two sides of the disk.

Figure 12:
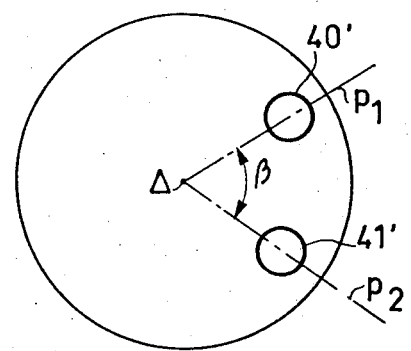
FIG. 12 an explanatory diagram of a special arrangement according to the invention, particularly for the variant of FIG. 6.

If the system has more than two disks, it is merely necessary to provide one head for every two disks. In this case, it is only possible to read or inscribe a maximum half the data-carrying sides (using the recording head of FIG. 7). If it is desired to simultaneously read or inscribe all the sides, the successive recording-reading heads must be displaced and arranged in different vertical planes, due to the presence of the light receivers. The recording-reading head 40' for reading the first and second disks, fifth and sixth disks and so on can be located in a first vertical plane $p_1$, as illustrated in FIG. 12. The heads 41' for reading the third and fourth disks, seventh and eighth disks and so on are positioned in a second vertical plane $p_2$, forming an angle $\beta$ with the first plane $p_1$. In this case, there must be two radial driving devices for the heads. This special arrangement can also be adopted for the system described relative to FIGS. 3 to 5. In this case, the heads 40' and 41' are associated with different areas of the same disk side, so that it makes it possible to reduce the average access time to a predetermined track or permit the simultaneous reading of several tracks on the same side.

FIG. 10 illustrates a specific embodiment of an optical memory system incorporating a stack of disks and the recording-reading device of the invention.

The system has a stack of disks 10 to 13 rotated $\omega$ by shaft 2 driven by motor 3. The assembly is supported by frame 1000 of the optical memory system. The recording-reading heads are supported by a mobile means incorporating arms 60 to 62 for inserting the heads between the disks and a support 1001 driven by a linear stepping motor 6. The mobile means are guided by a member 1010 incorporating ball or guide bearings, not shown in FIG. 10.

The light emitters-receivers $ER_{10}$ to $ER_{12}$ and $ER_{20}$ to $ER_{22}$ are supported by arms 1004 to 1006 and 1007 to 1009 and beams 1002 and 1003 joined to frame 1000.

Figure 11:
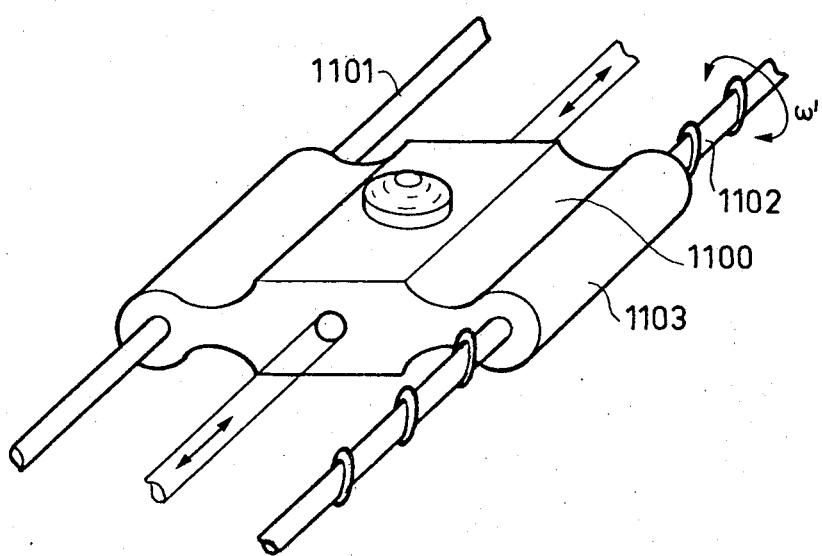
FIG. 11 an example of the mobile means according to the invention.

Instead of using a linear motor, it is also possible to use an endless screw system, as illustrated in FIG. 11. Each head is in the form of a carriage 1100 resting on two guide rods 1101 and 1102 parallel to the surface of the disks to be read, whereof one 1102 is provided with a helical thread having a very loose pitch (approximately 5 mm) and rotated $\omega'$ by means of a not shown stepping motor. The carriage flange 1103 has a complementary internal thread. Thus, the carriage carrying the focusing lenses, whereof one $OB_1$ is visible in FIG. 10, is driven parallel to the surface of the disks to be read.

According to a not shown variant, it is also possible to use the same carriage sliding on two parallel smooth rods driven by a system of pulleys. This type of drive is already used on certain tracing tables. However, it should be noted that in this case the radial control of the recording-reading head, assumed to be provided by the drive motor for the mobile means, will be difficult to obtain with this type of drive. It will then be necessary to slightly modify the design of the recording-reading heads and replace the fixed deviating mirror 416 (FIGS. 7 or 8), by a galvanometer mirror controlled by a galvanometer-type electromagnetic circuit. This type of mirror is well known to the skilled Expert and is widely used in the prior art recording-reading heads.

What is claimed is:

1. An optical system for the reading and recording of data media incorporated at least two stacked disks which are rotated about a common axis including at least one device comprising:
    a mobile assembly incorporating:
    (1) at least one recording-reading head with two focusing lenses having a common optical axis orthogonal to the main faces of the disks, said head being disposed between two consecutive disks and associated with a facing side of each of said consecutive disks,
    (2) a first position control member including at least one solenoid integral with one of the two focusing lenses for controlling movement thereof along said optical axis, and
    (3) a second position control member including at least one solenoid integral with the other lens for controlling movement thereof along said optical axis;
    an intermediate member between said lenses having a channel whose walls have two windows;
    a plane mirror in said channel reflecting on its main faces and forming an angle of $\pi/4$ radians with respect to said optical axes to reflect light transmitted through each of said windows from a light emitter to one of said lenses and reflect light from said lenses through one of said windows to a light receiver; and
    a housing for said mobile assembly and members including an assembly of magnetic material forming a magnetic circuit for said solenoids.

2. A system as in claim 1, wherein said intermediate member has a set of openings and including spindle means engaging said openings and mounting said mirror.

3. A system as in claim 1, further including a pair of units each including a light receiver and emitter.

4. A system as in claim 3, wherein each said light emitters includes stigmatic collimating means so that the emitted beam rays are parallel.

5. A system as in claim 3, wherein each pair of said emitter and receiver combinations are incorporated in a single housing including a semiconductor laser source, means for detecting incident light and a refringent optical block defined by a first planar face and a spherical convex face, one of the Weierstrass points of the dioptre formed by the convex face being located on the planar face, the latter being perpendicular to the line joining the Weierstrass point and the center of the spherical face, the source being positioned in the vicinity of said point.

6. A system as in claim 3, further including a linear stepping motor for displacing each said recording-reading head.

7. A system as in claim 1, further including a rotary stepping motor, two rods parallel to each other and to the main faces of the disks for mounting each recording-reading head and a helical screw thread coupling said rotary stepping motor to each said recording-reading head.

8. A system as in claim 1, further including two rods parallel to each other and to the main faces of the disks for mounting each recording-reading head, a rotary stepping motor and a belt coupling said rotary stepping motor to each said recording-reading head.

9. A system as in claim 1, further including at least two of said mobile assemblies mounted in separated planes orthogonal to the main faces of said disks.

10. An optical system for the reading and recording of data media incorporating at least two stacked disks which are rotated about a common axis comprising:
   a mobile assembly incorporating:
   (1) at least one recording-reading head with two focusing lenses joined for movement together and having a common optical axis orthogonal to the main faces of the disks, said head being disposed between two consecutive disks and associated with a facing side of each of said consecutive disks, and
   (2) a single position control member including at least one solenoid integral with one of the two focusing lenses for controlling movement thereof along said optical axis;
   an intermediate member between said lenses having a channel whose walls have two facing windows;
   a plane mirror in said channel reflecting on its main faces and forming an angle of $\pi/4$ radians with respect to said optical axes to reflect light transmitted through one of said windows from a light emitter to one of said lenses through said one of said windows to a light receiver and light transmitted through the other of said windows to the other of said lenses and reflect light from said one of said lenses and light from said other of said lenses through said other of said windows to a light receiver; and
   a housing for said mobile assembly and members including an assembly of magnetic material forming a magnetic circuit for said solenoid.

11. A system as in claim 10, wherein said intermediate member has a set of openings and including spindle means engaging said openings and mounting said mirror.

12. A system as in claim 10 further including a pair of units each including a light receiver and emitter.

13. A system as in claim 12, wherein each said light emitter includes stigmatic collimating means so that the emitted beam rays are parallel.

14. A system as in claim 12, wherein each pair of units is incorporated in a single housing including a semiconductor laser source, means for detecting incident light and a refringent optical block defined by a first planar face and a spherical convex face, one of the Weierstrass points of the dioptre formed by the convex face being located on the planar face, the latter being perpendicular to the line joining the Weierstrass point and the center of the spherical face, the source being positioned in the vicinity of said point.

15. A system as in claim 12, further including a linear stepping motor for displacing each said recording-reading head.

16. A system as in claim 10, further including a rotary stepping mirror, two rods parallel to each other and to the main faces of the disks for mounting each recording-reading head and a helical screw thread coupling said rotary stepping motor to each said recording-reading head.

17. A system as in claim 10 further including two rods parallel to each other and to the main faces of the disks for mounting each recording-reading head, a rotary stepping motor and a belt coupling said rotary stepping motor to each said recording-reading head.

18. A system as in claim 10, further including at least two of said mobile assemblies, mounted in separated planes orthogonal to the main faces of said disks.

* * * * *